Dec. 26, 1944.  P. MATHER ET AL  2,365,893
CATALYTIC CONVERSION OF HYDROCARBONS
Filed Aug. 5, 1939  2 Sheets-Sheet 1

FIG. 1

INVENTORS
PERCY MATHER
LEV A. MEKLER
BY Lee Cary
ATTORNEY

Dec. 26, 1944.    P. MATHER ET AL    2,365,893
CATALYTIC CONVERSION OF HYDROCARBONS
Filed Aug. 5, 1939    2 Sheets-Sheet 2

FIG. 2

INVENTORS
PERCY MATHER
LEV A. MEKLER
BY Lee J Gary
ATTORNEY

Patented Dec. 26, 1944

2,365,893

UNITED STATES PATENT OFFICE 2,365,893

CATALYTIC CONVERSION OF HYDROCARBONS

Percy Mather and Lev A. Mekler, Chicago, Ill., assignors to Universal Oil Products Company, Chicago, Ill., a corporation of Delaware Application August 5, 1939, Serial No. 288,510

15 Claims. (Cl. 196—49)

The invention is more specifically directed to an improved process involving simultaneously conducted endothermic and exothermic reactions. Hydrocarbons are converted in the endothermic step by passing the same in heated state in contact with a bed of catalytic material which promotes the desired conversion reaction and, in the exothermic step, heavy carbonaceous conversion products deposited on the catalyst particles during the endothermic step are burned therefrom to renew the activity of the catalyst by passing a stream of hot oxygen-containing gases through the catalyst bed.

In many of the processes of commercial significance so far developed for the catalytic conversion of hydrocarbons into products of a more valuable nature, the formation and deposition of hydrocarbonaceous materials in the catalyst bed progresses at such a rate that frequent reactivation of the catalyst is required. It is, therefore, expedient for accomplishing this reactivation in situ, (i. e., without removing the bed of catalytic material from the reactor wherein it is disposed and employed to promote the endothermic reaction).

In order to operate continuously and avoid interruption of the desired reactions, it is likewise common practice to employ a plurality of reactors, each containing one or more beds of the catalytic material, with provision for alternating the reactors with respect to the endothermic and exothermic reactions, one or more of said reactors serving as the zone in which conversion of the hydrocarbons is accomplished while the catalytic material in one or more reactors is being reactivated.

The common expedient for supplying the required heat to the catalyst bed and hydrocarbons undergoing conversion in the endothermic step is to jacket the reactor or provide tubular elements or the like within the catalyst bed, through which jacket or tubular elements a relatively hot convective medium is passed in indirect heat exchange with the catalyst and the reactants. Since burning of the carbonaceous deposits from the catalyst, to accomplish its reactivation, is an exothermic reaction which requires control to prevent excessive heating of the catalyst bed and consequent possible destruction of the catalyst or permanent impairment of its catalytic activity, the same jacket, tubular elements or the like, through which the relatively hot convective medium is circulated during processing of the reactants, is ordinarily employed for circulating a relatively cool convective medium in indirect heat transfer relation with the catalyst, oxidizing gases and the hot combustion products formed during reactivation.

Since relatively large quantities of heat are ordinarily evolved in the exothermic step, it is necessary, for good thermal efficiency, to recover a substantial portion of the available heat in the spent reactivating gases for some useful purpose. In many instances, this available heat will fulfill a major portion of the heat requirements of the endothermic step and its use for this purpose makes for greater economy and a more self-contained process. This has been accomplished in previous systems of this general type by employing the same convective medium for heating in the endothermic step and for cooling in the exothermic step, the conductive medium being circulated, first in indirect heat transfer relation with the catalyst in the reactor wherein reactivation is taking place and then in indirect heat transfer relation with the catalyst in the reactor wherein processing or conversion of the hydrocarbons is taking place.

The present invention follows the conventional practice with respect to periodic processing of the reactants and reactivation of the catalyst in situ, but involves a decided and advantageous departure from prior practice with respect to the method provided for transferring heat from the exothermic to the endothermic reaction and controlling temperatures in both the endothermic and exothermic steps.

To maintain the hydrocarbon reactants within the temperature range at which their desired conversion will progress satisfactorily during their contact with the catalyst, we employ a plurality of catalyst beds through which the reactants are passed in series and heat the reactants prior to their contact with each catalyst bed. The size of each catalyst bed and the consequent degree of conversion obtained therein is so regulated that the temperature of the reactants, as they are cooled by the heat given up to the endothermic reaction as they pass through the bed, is not reduced to below the optimum range within the catalyst bed. The heat thus lost by the reactants is replaced and the desired higher temperature level reestablished as the reactants pass from each catalyst bed of the series to the next successive bed by reheating the reactants between catalyst beds. This reheating of the reactants is so regulated that their temperature upon entering each catalyst bed does not exceed the optimum range for accomplishing the desired conversion therein. It is within the scope of the invention to employ substantially the same range of temperature within each of the several catalyst beds or to vary the temperatures with respect to the several beds to suit requirements. For example, progressively increasing or progressively decreasing average temperatures may be employed in the successive catalyst beds or conditions may be regulated to establish a predetermined maximum or minimum average temperature at an intermediate point in the series of beds.

To transfer substantial quantities of heat from the exothermic to the endothermic step, we employ masses of refractory material such as ceramics or metals of relatively high heat capacity through which the hot reactivating gases are passed following contact thereof with the catalytic material being reactivated, whereby heat is given up from the hot reactivating gases to the refractory mass and stored therein. When the reactor containing the thus heated mass of refractory material is changed over from reactivating to processing service, the reactants to be converted are passed through the mass of hot refractory material prior to their contact with the catalyst bed in this reactor and a portion of the heat required for conducting the exothermic reaction is thereby imparted from said heated mass to the reactants by direct contact therebetween.

The endothermic and exothermic steps are seldom in exact thermal balance; i. e., the heat which can be transferred from the exothermic to the endothermic step will not exactly correspond to the heat requirements of the endothermic step. The invention, therefore, provides for further adjusting the temperature of either the reactants or the reactivating gases, or both, prior to each contact thereof with the successive beds of catalytic material, in addition to the adjustment accomplished by contacting these materials with the refractory material disposed between the successive catalyst beds. This may involve either further heating or partial cooling of the reactants and/or either further cooling or partial reheating of the reactivating gases and adjustment of the temperature of the reactants and/or reactivating gases in either direction is within the scope of the invention. In the instances most commonly encountered, with a type of catalyst, temperature ranges and other operating conditions preferably employed, the reactants will require heating and the reactivating gases will require cooling, in addition to the heating and cooling, respectively, accomplished by their contact with the refractory material.

In addition to the provisions for adjusting the temperature level of the reactants and/or reactivating gases between successive catalyst beds, the invention further provides for controlling the total quantity of heat supplied to the refractory material and stored therein for subsequent use during processing of the reactants, independent of the heat available for this purpose in the hot reactivating gases. It also provides for maintaining the quantity of heat supplied from the refractory material to the reactants and maintaining the temperature at which the reactants are supplied to the catalyst bed substantially uniform during the entire processing period in each reactor regardless of the reduction in the temperature of the refractory mass, as the period progresses, due to the heat supplied therefrom to the reactants. The method whereby these controls are obtained, will be described in conjunction with the accompanying drawings.

Many of the features of the invention herein disclosed, including the improved form of reactors provided and the methods above outlined of transferring heat from the exothermic to the endothermic reaction and controlling reaction temperatures in both the endothermic and exothermic steps, may be employed to advantage in a wide variety of processes involving simultaneously conducted endothermic and exothermic reactions wherein the endothermic reaction is catalytically promoted and the exothermic reaction comprises reactivation of the catalyst. Catalytic cracking, dehydrogenation, aromatization and cyclization are a few well known examples of such processes to which the features of the invention, above mentioned, are applicable. However, in some of its more specific aspects the invention herein provided and claimed is particularly directed to catalytic cracking and since a more detailed description of this phase of the invention will serve as a specific illustration of the features and advantages of the invention, we have selected a catalytic cracking system for illustration in the accompanying diagrammatic drawings and the description of the drawings is directed to a description of the system and its operation for catalytically cracking hydrocarbon oils.

Figure 1:
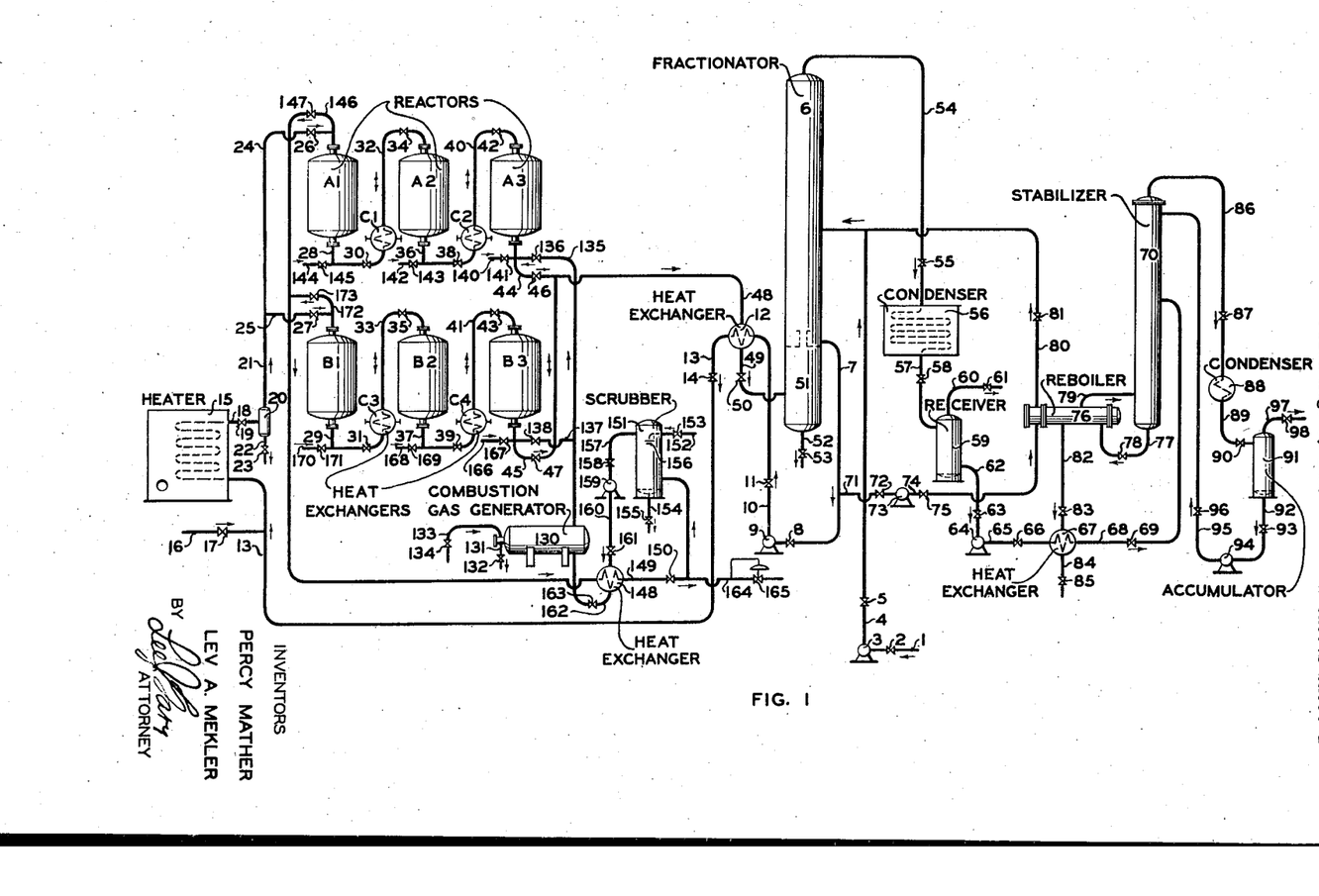
Fig. 1 of the drawings is essentially a flow diagram of the catalytic cracking system employing the features provided by the invention and Fig. 2 illustrates one specific form of reactor embodying certain features of the invention and which may be employed to advantage with the process flow illustrated in Fig. 1.

Referring to Fig. 1, the raw oil charging stock is supplied through line 1 and valve 2 to pump 3 by means of which it is fed through line 4 and valve 5 into fractionator 6, wherein it directly commingles with the vaporous conversion products undergoing fractionation, is heated by contact with the vapors and serves to assist their fractionation. The thus preheated charging stock commingled with reflux condensate, comprising heavy fractions of the vaporous conversion products which are condensed in fractionator 6, is removed as combined feed from the lower portion of the fractionator, wherein it accumulates, and is directed through line 7 and valve 8 to pump 9, by means of which it is fed through line 10 and valve 11 to heat exchanger 12. It passes through heat exchanger 11 in indirect contact with the hot conversion products prior to their fractionation. The resulting preheated combined feed is directed from heat exchanger 12 through line 13 and valve 14 to heater 15.

The function of heater 15 is to supply sufficient heat to the combined feed to effect its substantially complete vaporization at the required superatmospheric pressure and any desired form of heater capable of accomplishing this may be employed within the scope of the invention. When desired, in order to reduce the effective pressure, assist vaporization and aid in preventing substantial thermal decomposition of the oil, regulated quantities of relatively inert, low molecular weight material such as steam or hydrocarbon gas may be commingled with the combined feed prior to its introduction into heater 15. Line 16 and valve 17, communicating with line 13, is provided for this purpose in the case here illustrated. The highly heated and substantially vaporized combined feed is directed from heater 15 through line 18 and valve 19 to a separator or knock-out drum 20, which may be empty, provided with baffles, perforated pans or the like or it may contain tar-absorbing or polymerizing materials, wherein any high coke-forming unvaporized fractions of the combined feed are separated from the relatively clean vapors, the latter being directed from drum 20 through line 21 to the catalytic reactors, as will be later described, while the non-vaporous high coke forming materials are removed from drum 20 and from the system through line 22 and valve 23 or permitted to deposit on the material within the drum and periodically removed by burning the deposited high coke-forming materials from the absorbent mass or replacing the mass with fresh absorbent material.

In the particular case here illustrated, two sets or groups, A and B, of catalytic reactors are employed, group A consisting of three reactors A1, A2 and A3 and group B consisting of three reactors B1, B2 and B3, the reactors of each group being connected in series and the two groups being connected in parallel. It is, of course, within the scope of the invention to provide any desired number of reactors in each group. Preferably, the reactors are substantially identical and may be of the general form illustrated in Fig. 2 and hereinafter described or of any other suitable form capable of accomplishing the same purpose. In this particular instance, each of the reactors contains a single bed of catalytic material capable of promoting the cracking reaction and of sufficiently small volume in relation to the quantity of vaporous hydrocarbon reactants passed therethrough in a given time that the temperature drop through each catalyst bed will not be excessive (i. e., the temperatures prevailing throughout the catalyst beds are within the optimum range for converting the reactants into high yields of good antiknock gasoline).

Each of the reactors also contains a bed or mass of refractory material of relatively high heat capacity or metal which is not adversely affected by and does not adversely affect the reactants or the catalyst. The vaporous hydrocarbon reactants are passed through this mass and heated by contact therewith to the desired conversion temperature prior to their contact with the catalyst.

Instead of employing a plurality of reactors each containing a single bed of refractory material or metal shapes and a single bed of catalyst, the invention specifically contemplates the use of one or more reactors in each group, each containing a plurality of spaced catalyst beds with interposed beds of said refractory material and a bed of the latter on the up-stream side of the first catalyst bed or, when desired, the catalyst beds and the beds of refractory material may be disposed in separate structures with arrangement for the series flow of reactants first through a bed of refractory material then through a catalyst bed throughout the series.

Each group of reactors is alternately employed for processing the reactants and for reactivation of the catalyst, the refractory material in the reactors of the group in which the catalyst is being reactivated being heated by the hot reactivating gases issuing from the catalyst beds and the refractory material thus heated during reactivation being subsequently employed in these reactors during processing to supply heat to the reactants prior to their contact with the catalyst in each reactor.

When the reactors of group A are employed for heating and processing of the reactants, the latter flow from line 21 through line 24 and valve 26 to reactor A1 wherein they are first heated by contact with the refractory material and then passed through the catalyst bed wherein a portion of the cracking reaction takes place and the temperature of the reactants and resulting conversion products is somewhat reduced. The stream of reactants flow from reactor A1 at the reduced temperature through line 28 and valve 30 to heater C1, wherein their temperature is increased as desired and, preferably, to substantially the same temperature as that of the reactants entering reactor A1. The thus reheated reactants pass from heater C1 through line 32 and valve 34 into reactor A2 wherein further cracking is accomplished in the same manner as in reactor A1. The resulting partially cooled reactants pass through line 36 and valve 38 to heater C2, wherein their temperature is again increased, as desired, and wherefrom the reheated materials pass through line 40 and valve 42 into reactor A3. The cracking reaction is completed in reactor A3 in the same manner as described with reference to reactors A1 and A2. The resulting conversion products, which are still at a relatively high temperature but somewhat cooler than the stream supplied to reactor A3, are directed from the latter zone through line 44, valve 46 and line 48 to heat exchanger 12, wherein their temperature is substantially further reduced by indirect heat exchange with the combined feed passed through this zone, as previously described, and wherefrom the conversion products pass through line 49 and valve 50 to the vaporizing and separating chamber 51.

Before the formation and deposition of heavy carbonaceous materials on the catalyst particles has reduced the activity of the catalyst in the reactors of group A to a point where excessive degradation in the yield and quality of products would result, the stream of vaporous reactants is diverted from the reactors of group A and supplied through line 25 and valve 27 to the reactors of group B, wherein the cracking reaction continues while the catalytic material in the reactors of group A is reactivated, as will be subsequently described.

In each of the reactors of group B, conversion and heating of the reactants is accomplished in the same manner as previously described with reference to the reactors of group A, heaters C3 and C4 performing the same function as heaters C1 and C2, the flow of reactants being from reactor B1 through line 29 and valve 31 to heater C3, thence through line 33 and valve 35 to reactor B2, thence through line 37 and valve 39 to heater C4, thence through line 41 and valve 43 to reactor B3, the conversion products finally passing from reactor B3 through line 45, valve 47 and line 48 to heat exchanger 12 wherefrom the partially cooled conversion products are directed through line 49 and valve 50 to the vaporizing and separating section 51 of the fractionating column.

The intermediate heaters C1, C2, C3 and C4 preferably are substantially identical and may be of any desired form capable of reheating the reactants to the required temperature. In the particular case here illustrated, these heaters are represented as tubular heat exchangers through which a convective medium, such as combustion gases or a liquid or vaporous medium such as a suitable salt, eutectic mixture of salts or low melting point metal or alloy in molten state is passed at the required temperature in indirect heat transfer relation with the reactants. When desired, any other suitable form of heater such as a furnace having a closed coil heated by combustion products generated within the furnace structure may be employed within the scope of the invention, but ordinarily this form of structure is not preferred since it is capable of functioning efficiently as a heater only, while a heat exchanger may be employed to transfer heat in either direction. This is important since, although referred to as heaters, members C1 to C4 inclusive, in the case here illustrated, function as coolers for the stream of revivifying gases, as will be later explained, when the catalyst beds in the reactors to which they are connected are being reactivated. This obviates the use of separate heating and cooling facilities between the reactors.

The conversion products supplied, as previously described, from the group of reactors in which processing is taking place to separating chamber 51 are therein separated into relatively clean vapors and residual liquid components. The latter are removed from the lower portion of chamber 51 through line 52 and valve 53 to cooling and storage or elsewhere, as desired. A suitable pump, not shown, may be employed when required for removing residual liquid from chamber 51 and directing it to the desired destination.

The relatively clean vapors from chamber 51 are fractionated in the upper section of the same column, designated as fractionator 6, in commingled state with the charge, to condense as reflux condensate their components boiling above the range of the desired final products. The fractionated vapors of the desired end-boiling point are directed from the upper portion of fractionator 6 through line 54 and valve 55 to condenser 56 wherefrom the resulting distillate and uncondensed gases are directed through line 57 and valve 58 to collection and separation in receiver 59.

Since the process is preferably operated at relatively low superatmospheric pressure, considerable quantities of low-boiling, normally liquid fractions will usually be included in the normally gaseous fractions collected in receiver 59. These materials are directed from the receiver through line 60 and valve 61, preferably to suitable absorption equipment of any desired conventional form, not illustrated, capable of recovering the desired heavy fractions from the gases.

The distillate collected in receiver 59 will contain substantial quantities of dissolved normally gaseous fractions and is directed from the receiver through line 62, valve 63, pump 64, line 65, valve 66, heat exchanger 67, line 68 and valve 69 to stabilizer 70, wherein regulated quantities of the dissolved gases are liberated to obtain a final liquid product of the desired vapor pressure.

Preferably, regulated quantities of the distillate collected in receiver 59 are returned therefrom by well known means, not illustrated, to the upper portion of fractionator 6 to serve as a cooling and refluxing medium in this zone.

The distillate to be stabilized is reheated in passing through heat exchanger 67 by indirect heat exchange with the reboiled bottoms from the stabilizer, reboiling being accomplished, in the case here illustrated, by directing regulated quantities of the combined feed from fractionator 6 through line 71 and valve 72 to pump 73 wherefrom it is supplied through line 74 and valve 75 to reboiler 76, passing therethrough in indirect heat exchange relation with bottoms from stabilizer 70 which are supplied to the reboiler through line 77 and valve 78. The vapors evolved in reboiler 76 are directed therefrom through lines 79 to the stabilizing column and the resulting cooled combined feed is returned from the reboiler through line 80 and valve 81 to fractionator 6. The hot reboiled distillate comprising the final light liquid product of the desired vapor pressure is directed from the reboiler through line 82 and valve 83 to heat exchanger 67, wherein it supplies heat to the distillate passing to the stabilizer by indirect heat exchange therewith, the final stabilized product being directed from heat exchanger 67 through line 84 and valve 85 to further cooling and storage or elsewhere, as desired.

The gases evolved from the distillate in stabilizer 70 are directed from the upper portion thereof through line 86 and valve 87 to cooler 88, wherein they are partially condensed to form a refluxing medium for use in the stabilizing column, the resulting normally gaseous condensate and uncondensed gases passing from cooler 88 through line 89 and valve 90 to accumulator 91 wherefrom condensate is returned by means of line 92, valve 93, pump 94, line 95 and valve 96 to the upper portion of the stabilizer as a cooling and refluxing medium, while the gas is released from the accumulator through line 97 and valve 98 to storage or elsewhere, as desired.

In the particular case here illustrated, substantially oxygen-free combustion gases are generated in a closed combustion gas generator 130 by the combustion of fuel and air supplied thereto through lines 131 and 133 containing the respective valves 132 and 134. These freshly generated gases, after mixing in the generator with cooler combustion gases supplied thereto as hereinafter described, are directed through line 135 wherefrom they are supplied through valve 136 to the reactors of group A, when regeneration is taking place in the latter, and through line 137 and valve 138 to the reactors of group B, when they are being employed for regeneration.

The general direction of flow through each reactor and through the series of reactors during regeneration is in the case here illustrated reverse to the flow therethrough during processing. When the reactors of group A are employed as catalyst regenerating zones, the hot combustion gases with which regulated quantities of air are commingled, by introducing the latter into line 135 through line 140 and valve 141, pass into reactor A3 wherein they contact the catalyst mass disposed therein and burn deposited carbonaceous material therefrom, whereby the temperature of the reactivating gases is materially increased. They then pass through the mass of refractory material disposed in this reactor and give up a substantial portion of their heat thereto. The resulting spent and partially cooled reactivating gases are directed from reactor A3 through line 40 and valve 42 to zone C2 which, in this case, serves as a cooler, whereby the temperature of the gases is further reduced to the desired degree. They then pass through line 36 and valve 38, together with regulated quantities of air admitted through line 142 and valve 143 into reactor A2, wherethrough the flow is the same as that described in conjunction with reactor A3 and wherefrom the partially cooled spent reactivating gases pass through line 32 and valve 34 to cooler C1 and thence through line 28 and valve 30, together with regulated quantities of air introduced through line 144 and valve 145 into reactor A1. The flow through reactor A1 is the same as that described with reference to reactor A3 and the partially cooled spent reactivating gases are directed therefrom through line 146 and valve 147 to heat exchanger 148 wherein their temperature is further reduced, as will be later described, and wherefrom they pass through line 149 and valve 150 to scrubber 151. The spent and partially cooled reactivating gas stream is intimately contacted in scrubber 151 with a spray of water or an aqueous solution of caustic soda or the like, to condense steam formed by combustion of the carbonaceous material in the catalyst beds and to remove any undesirable sulfur compounds and the like from the gases. The water or caustic solution is introduced to scrubber 151 through line 152 and valve 153, this line preferably terminating within the scrubber in a suitable spray head or the like indicated at 156. The spray material and condensed steam, containing the objectionable compounds removed from the combustion gases, are withdrawn from the lower portion of the scrubber through line 154 and valve 155. The relatively cool combustion gases leaving scrubber 151 are directed through line 157 and valve 158 to compressor 159 by means of which they are supplied through line 160 and valve 161 to heat exchanger 148, wherein they are partially reheated by passing therethrough in indirect heat exchange relation with the hot reactivating gases being returned, as previously described, to scrubber 151. The scrubbed and partially reheated gases are directed from heat exchanger 148 through line 162 and valve 163 into the combustion gas generator 130, wherein they are commingled with controlled amounts of hot combustion gases freshly generated in this zone to form a mixture of combustion gases at substantially the temperature desired for reactivation of the catalyst. These gases are directed, as previously described, to the group of reactors wherein regeneration is taking place and controlled relatively small amounts of air are added to the stream of reactivating gases in the manner previously described, prior to the initial and each successive contact of the gases with the catalytic material. The added air serves to support combustion of the carbonaceous materials deposited on the catalyst and the amount employed controls the rate of oxidation and the temperature attained in the catalyst bed during regeneration. Since freshly generated hot combustion gases are continuously added to the circulating stream of combustion gases employed as the oxygen-carrier and diluent, provision is made for removing the excess of spent combustion gases from the system at a point in the cycle at which the gases are relatively cool. This is accomplished, in the case here illustrated, by means of line 164 and valve 165 and preferably valve 165 is an automatic pressure-control valve of any suitable type by means of which the excess gases are automatically discharged from the cycle and a substantially constant pressure is maintained in the latter.

When the catalyst beds in the reactors of group B are being reactivated, the flow therethrough is the same as that described in conjunction with the reactors of group A, with cooler C4 and C3 serving, respectively, to reduce the temperature of the reactivating gases passing from reactor B3 to reactor B2 and from reactor B2 to reactor B1. Controlled quantities of air are added to the stream of gases entering reactor B2 through line 168 and valve 169, and line 170 containing valve 171 is provided for the introduction of controlled quantities of air into the stream of reactivating gases entering reactor B1. The spent reactivating gases leaving reactor B1 pass through line 172 and valve 173 to line 146 wherefrom they pass, as previously described, to heat exchanger 148 and thence to scrubber 151.

At the end of each regenerating period, in case heat supplied from the hot products of regeneration to the mass of hot refractory material in the reactors, wherein regeneration has been completed, is not sufficient to fulfill the heat requirements of the reactants passing through these reactors in the subsequent processing period, the circulation of hot combustion gases from the combustion gas generator through these reactors back to the generator, in the manner above described, may be continued for a sufficient length of time to store the required additional heat in the refractory mass. During this period, when employed, the supply of air to the circulating stream of combustion gases may be and is preferably discontinued since regeneration of the catalyst will have been completed and the added air will serve no useful purpose.

Figure 2:
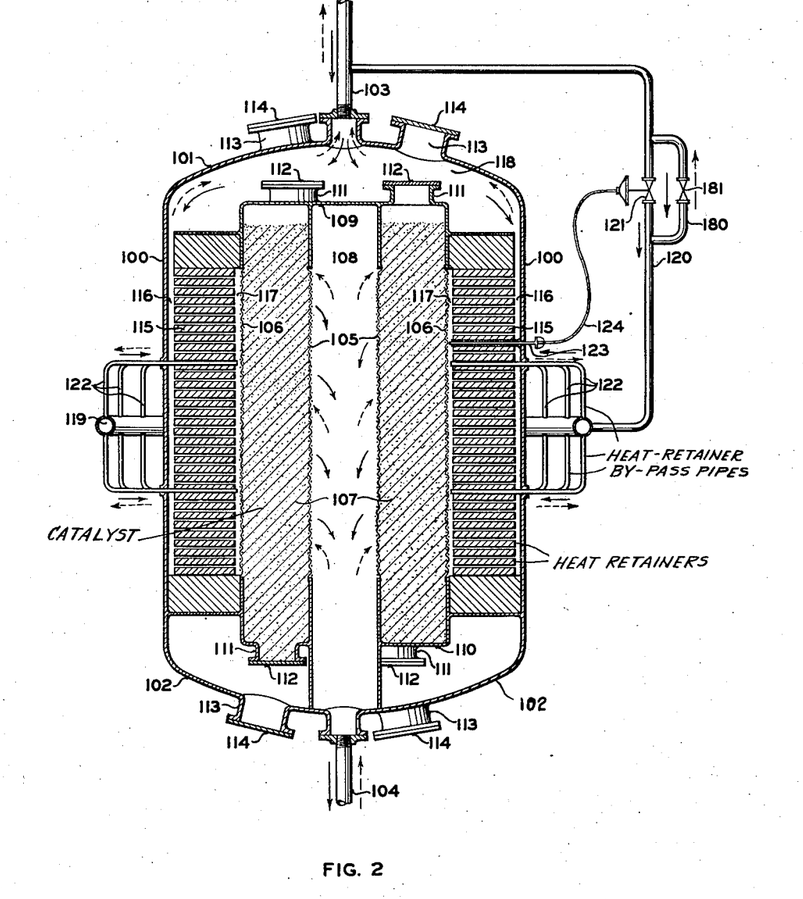

Referring now to Fig. 2, which is a sectional elevation of one specific form of reactor which may be employed in conducting the process of the invention: The cylindrical outer shell 100 of the reactor is closed at the top and bottom by heads 101 and 102, respectively. A conduit 103 is provided in the top head which, in the case here illustrated, serves as an inlet line for reactants and as an outlet line for spent reactivating gases. A conduit 104 is provided in the bottom head which serves as an outlet line for reactants and/or conversion products and as an inlet line for the hot oxygen-containing gases utilized to reactivate the catalyst.

Concentric spaced screens or grids 105 and 106 are provided in the central portion of the shell and the space provided therebetween is substantially filled with catalytic material indicated at 107. The space 108 enclosed by the inner cylindrical screen 105 is closed at the top by the member 109 which also closes off the upper portion of the space in which the catalyst bed is disposed. Space 108 communicates at its lower end with conduit 104. The lower portion of the space containing the catalyst bed is closed by member 110 and nozzle connections 111 or other suitable openings having removable cover plates 112 and communicating with the space provided between screens 105 and 106 in which the catalyst bed is disposed are provided in the end members 109 and 110, these cover plates and openings being accessible through nozzles or other suitable openings 113 having removable cover plates 114 provided in the top and bottom heads of the reactor, whereby spent catalyst which is no longer susceptible to satisfactory reactivation may be removed from the reactor, when required, and replaced with fresh catalyst.

A concentric bed or mass 115 of refractory material of relatively high heat capacity, such as checker-brick work, glazed tile shapes, metallic members or the like, the bricks or other individual members of the bed or mass preferably being of low porosity, is provided between the cylindrical outer wall 100 and the other cylindrical screen 106 and is spaced from each to provide spaces 116 and 117 therebetween. The outer space 116 is closed at the bottom and open at the top to communicate at its upper end with space 118 provided between upper head 101 and member 109, and the inner space 117 is closed at both ends.

A header or duct or conduit 119 communicating with conduit 103 through line 120 having valve 121 disposed therein, is provided about the outer shell of the reactor and branch conduits 122 connect header 119 directly with space 117.

Valve 121 may be manually operated, but preferably is a variable flow type of automatic control valve actuated in response to the temperature of the materials within or leaving space 117 by means of a thermostat or other temperature sensitive device 123 communicating with the valve through line 124.

When conversion is taking place in the reactor of Fig. 2, the flow therethrough, as indicated by the arrows shown in solid lines, is as follows: The stream of hydrocarbon vapors to be converted passes from conduit 103 into space 118. The vapors flood space 116 between outer shell 100 and refractory mass 115 and pass through the latter to space 117 between the refractory mass and the catalyst bed and are heated during their passage through the refractory mass by heat stored within the latter during a previous period of reactivation. The heated vapors pass through screen 106 into and through the catalyst bed 107, wherein their conversion is accomplished and the resulting products pass through screen 105 into space 108 wherefrom they are removed through conduit 104.

Due to the heat given up by the hot refractory mass to the hydrocarbon vapors passing therethrough, the temperature of said mass will decrease as the operation progresses and in order to maintain the temperature of the heated hydrocarbon vapors entering the catalyst bed substantially constant, diminishing quantities of the vapors supplied to the reactor through conduit 103 by-pass the bed of hot refractory material by means of line 120, valve 121, header 119 and lines 122. A small decrease in the temperature of the vapors entering the catalyst bed operates through the temperature sensitive device 123 to restrict the opening through valve 121 and send larger quantities of the vapors through the hot refractory mass. Thus, the temperature of the vapors entering the catalyst bed and the conversion temperature maintained therein is kept substantially constant during the entire processing period.

When the catalyst mass requires regeneration, the flow through the reactor is reversed, as indicated by the arrows shown with broken lines, and oxygen-containing gases are directed through line 104 to space 108 wherefrom they pass through screen 105 into and through the catalyst bed 107, whereby carbonaceous material deposited during the previous processing cycle is burned from the catalyst particles. The resulting hot gases pass through screen 106 into space 117 and thence through the refractory mass 115 to which they give up a substantial portion of their heat and wherefrom they are directed through space 116 and space 118 to conduit 103 through which they are removed from the reactor.

In case the heat available from the hot reactivating gases leaving the catalyst bed is substantially more than that required by the reactants entering the catalyst bed in the subsequent processing period, the by-pass arrangement comprising lines 122, header 119 and line 120 may be employed to divert a regulated portion of the hot regenerating gases past the bed of refractory material in the reactor directly to line 103 and thereby reduce the heat supplied to the refractory mass. To permit this method of operation, a by-pass line 180 having control valve 181 disposed therein is provided around valve 121, valve 121 remaining closed and valve 181 being regulated to suit requirements when regeneration is taking place in the reactor and valve 181 remaining closed while valve 121 is regulated to suit requirements while process of the reactants is taking place in the reactor.

As an example of one specific operation of the process herein provided, the charging stock is a Mid-Continent gas-oil of approximately 36 to 38° A. P. I. gravity and a synthetically prepared alumina-silica catalyst, containing approximately 15% alumina and approximately 85% silica and substantially free of alkali metal ions is employed. The charging stock is supplied to the system at the rate of approximately 1600 barrels (42 gallons) per stream day and the recycle ratio (ratio of recirculating reflux condensate or recycle stock to raw oil is approximately 4:1, making a total of approximately 8000 barrels of combined feed subjected to cracking per stream day. The combined feed is supplied through heater 15 from fractionator 6 at a temperature of approximately 720° F. and is heated together with approximately 9500 pounds per hour of steam to an outlet temperature of approximately 950° F. with a superatmospheric pressure at the outlet of heater 15 of approximately 60 pounds per square inch. This quantity of steam gives a molecular ratio of steam to oil of approximately 1:1.

The stream of combined feed and steam is supplied from heater 15 at substantially the temperature and pressure mentioned to the first reactor of the series and in passing through the bed of hot refractory material in this zone is further heated to a temperature of approximately 975° F. at which temperature it enters the catalyst bed. The temperature of the oil vapors and steam leaving the first reactor is approximately 925° F. and this material is reheated in transit to the second reactor of the series to a temperature of approximately 950° F., further heated in passing through the bed of hot refractory material in this zone to a temperature of approximately 975° F. and then contacted with the second catalyst bed. The products leaving the second reactor at a temperature of approximately 925° F. are heated in transit to the third reactor to approximately 950° F., further heated therein in passing through the bed of hot refractory material therein to a temperature of approximately 975° F., at which temperature they are contacted with the third bed of catalyst, emerging from the third reactor of the series at a temperature of approximately 925° F. These products are cooled in heat exchanger 12 to a temperature of approximately 825° F. and introduced into separating chamber 51 which is operated at a superatmospheric pressure of approximately 30 pounds per square inch. Substantially the same pressure is employed in the succeeding fractionating, condensing and collecting equipment and stabilizer 70 is operated at a superatmospheric pressure of about 200 pounds per square inch. Fractionator 6 is operated with a top temperature regulated to give an overhead distillate product of approximately 450° F. end-boiling point.

The reactivating gases derived, as previously described, and containing approximately 1.25% of free oxygen enter the first reactor of the series in which reactivation is taking place at a temperature of approximately 925° F., are heated in passing through the catalyst bed in this zone to a temperature of approximately 1150° F. and, after giving up heat to the bed of refractory material through which they are then passed, emerge from this reactor at a temperature of approximately 1025° F. They are then cooled in transit to the second reactor of the series to a temperature of approximately 950° F. and after sufficient additional air is added thereto to bring the oxygen concentration back to that previously mentioned and the temperature to approximately 925° F. they are passed through the catalyst bed in the second reactor, therein heated to a temperature of approximately 1150° F., thence passed through the bed of refractory material in this zone and emerged from the second reactor at a temperature of approximately 1025° F. This procedure is repeated in the third reactor of the series after cooling the gases in transit thereto from the second reactor to a temperature of approximately 950° F. and renewing their oxygen concentration and the gases discharged from the third reactor of the series are cooled in the heat exchanger to a temperature of approximately 950° F., the resulting cooled gases being discharged, in part, from the system and the remainder supplied to scrubber 151 wherefrom they are recycled with freshly generated combustion gases from combustion gas generator 130 to the first reactor undergoing reactivation after the oxygen concentration, previously mentioned, is again established by the addition of air.

The above described operation will yield per barrel of raw oil charging stock supplied to the system, approximately 70% by volume of 450° F. end-point gasoline, having a Reid vapor pressure of approximately 10 pounds per square inch, and about 5% of residual oil. Aside from the small amount (approximately 4% by weight of the charging oil) of coke deposited on the catalyst and burned therefrom during reactivation, the remainder is chargeable to normally gaseous fractions containing a high proportion of polymerizable olefins. Catalytic polymerization of the heavy olefinic components of these gases will yield an additional 12%, or thereabouts, based on the charging stock of polymer gasoline which may be blended with the catalytically cracked product, giving an overall yield of 82% gasoline having an octane number (C. F. R.) of 80 to 82.

We claim as our invention:

1. The process of catalytically cracking hydrocarbon oil, which comprises heating a flowing stream of said oil to a temperature at which it is substantially completely vaporized under conditions regulated to preclude substantial thermal cracking thereof, passing the resulting vapors in series through a plurality of separate beds of catalytic material and therein effecting said catalytic cracking, maintaining temperatures in each of the catalyst beds within the range required for conducting the desired cracking reaction by adjusting the temperature of said vapors to the desired value prior to each successive contact thereof with a bed of said catalytic material, accomplishing said adjustments, at least in part, by passing regulated quantities of the vapors through a mass of previously heated refractory material prior to their passage through each catalyst bed of the series, periodically diverting the stream of vapors leaving the first mentioned heating step to and through another group of separate catalyst beds in series and therein continuing the cracking reaction in the manner hereinbefore described, simultaneous with the passage of said vapor stream through the second group of catalyst beds, reactivating the catalyst in the first group of beds by burning from the catalyst, in a stream of hot, oxygen-containing gases, heavy carbonaceous materials deposited thereon during the cracking operation, utilizing resulting heated gases leaving each of the catalyst beds during the reactivating step to supply heat to said refractory material for conducting a subsequent cracking step in the same group of catalyst beds by passing said heated gases in contact with said refractory material, subsequently again passing said stream of hydrocarbon vapors from the first mentioned heating step through the first mentioned group of catalyst beds, therein continuing the cracking operation in the manner hereinbefore described and reactivating the catalyst in the second mentioned group of beds in the same manner as hereinbefore described, directing conversion products throughout the operation from the group of catalyst beds wherein the cracking reaction is being conducted to separating and recovery equipment, therein separating from said products materials boiling above the range of the desired gasoline product and recovering the latter.

2. The process defined in claim 1, wherein selected normally liquid fractions separated from said conversion products and boiling above the range of said gasoline are further cracked in the same system by supplying the same to the first mentioned heating step.

3. The process defined in claim 1, which includes the further steps of cooling the spent reactivating gases leaving the group of catalyst beds wherein reactivation is taking place, removing a portion of the cooled gases from the system, scrubbing the remaining portion thereof to remove deleterious components therefrom, reheating the scrubbed gases by passing the same in indirect heat exchange with the stream of relatively hot, spent reactivating gases in the zone wherein said cooling of the latter is accomplished, further heating said scrubbed gases by commingling therewith freshly generated hot combustion gases in quantities substantially equivalent to the quantity of spent reactivating gases removed from the system, adding regulated minor amounts of air to the mixture and returning the same for further use as reactivating gases to the group of catalyst beds wherein reactivation is taking place.

4. In a catalytic cracking process employing a reaction zone in which a stream of heated hydrocarbons to be cracked is passed in contact with a bed of solid cracking catalyst and wherein the cracking reaction is conducted, the supply of said hydrocarbons to the reaction zone being periodically discontinued while deleterious heavy combustible conversion products deposited in said bed during the cracking reaction are burned therefrom to regenerate the catalyst by passing relatively dilute hot oxidizing gases in contact therewith, the supply of said hydrocarbons to the reaction zone being subsequently renewed and the cracking reaction therein continued, the improvement which comprises, during the regenerating step, passing hot gases leaving said catalyst bed in contact with a mass of refractory material of high heat capacity to store heat in the latter and, during the subsequent cracking period, passing a portion of the hydrocarbon reactants to be cracked in contact with said heated refractory mass to supply heat to the reactants, preventing another portion of the reactants from contacting the heated refractory mass, commingling said portions prior to their introduction into the catalyst bed, and diminishing the quantity of the second named portion as the cracking period progresses and as the hot refractory mass is cooled so as to maintain the temperature of the commingled reactants entering the catalyst bed substantially uniform during the entire cracking period.

5. In a catalytic cracking process employing a reaction zone in which a stream of heated hydrocarbons to be cracked is passed in contact with a porous bed of solid cracking catalyst of relatively low thermal conductivity and wherein the cracking reaction is conducted, the supply of said hydrocarbons to the reaction zone being periodically discontinued while deleterious heavy combustible conversion products deposited in said bed during the cracking reaction are burned therefrom to regenerate the catalyst by passing relatively dilute hot oxidizing gases in contact therewith, the supply of said hydrocarbons to the reaction zone being subsequently renewed and the cracking reaction therein continued, the improvement which comprises, during the regenerating step, passing a portion of the hot gases leaving the catalyst bed in contact with a mass of refractory material of high heat capacity to store heat in the latter, preventing contact between said mass and another portion of said hot gases, during the subsequent cracking period passing hydrocarbon reactants to be cracked in contact with the heated refractory mass prior to their contact with the catalyst, whereby to supply to said reactants at least a portion of the heat required for effecting said catalytic cracking thereof, and so controlling the quantity of said hot gases not passed in contact with said mass that substantially only the quantity of heat available in the hot gases which is required for conducting the subsequent cracking operation is imparted to the refractory mass.

6. In a catalytic cracking process employing a reaction zone in which a stream of heated hydrocarbons to be cracked is passed in contact with a porous bed of solid cracking catalyst of relatively low thermal conductivity and wherein the cracking reaction is conducted, the supply of said hydrocarbons to the reaction zone being periodically discontinued while deleterious heavy combustible conversion products deposited in said bed during the cracking reaction are burned therefrom to regenerate the catalyst by passing relatively dilute hot oxidizing gases in contact therewith, the supply of said hydrocarbons to the reaction zone being subsequently renewed and the cracking reaction therein continued, the improvement which comprises, during the regenerating step, passing a portion of the hot gases leaving the catalyst bed in contact with a mass of refractory material of high heat capacity to store heat in the latter, preventing contact between said mass and another portion of said hot gases, during the subsequent cracking period passing hydrocarbon reactants to be cracked in contact with the heated refractory mass prior to their contact with the catalyst, whereby to supply to said reactants at least a portion of the heat required for effecting said catalytic cracking thereof, and limiting the quantity of said hot gases passed in contact with the refractory mass to avoid excessive heat storage in the latter and assist in preventing excessive heating of the reactants passed therethrough during the subsequent cracking period.

7. In a catalytic cracking process employing a plurality of reaction zones through which heated hydrocarbons to be cracked are passed in series flow arrangement and contacted in each of said zones with a porous bed of solid cracking catalyst of relatively low thermal conductivity, the supply of said hydrocarbons to the reaction zones being periodically discontinued while the catalyst disposed therein is regenerated by passing relatively dilute hot oxidizing gases in contact therewith to burn from the bed combustible materials deposited therein during the cracking reaction, and the supply of said hydrocarbons to the reaction zones being subsequently renewed and their catalytic cracking therein continued, the improvement which comprises, during the regenerating period, passing hot regenerating gases leaving each of said catalyst beds in contact with a mass of refractory material of high heat capacity to store heat in the latter and, during the subsequent cracking period, contacting hydrocarbons to be converted with thus heated refractory material prior to each successive contact thereof with the catalyst, whereby to supply to the hydrocarbons at least a portion of the heat required for effecting their catalytic cracking, the process being further characterized in that the regenerating gases are passed through said reaction zones in series, the temperature of the reactivating gases passing from the hot refractory material to each successive catalyst bed being so modified and the oxygen concentration of the reactivating gases entering each catalyst bed and their rate of flow therethrough being so maintained that regeneration of the catalyst is accomplished within a temperature range beneath that at which damage to the catalyst will occur.

8. In a catalytic cracking process employing a plurality of reaction zones through which heated hydrocarbons to be cracked are passed in series flow arrangement and contacted in each of said zones with a porous bed of solid cracking catalyst of relatively low thermal conductivity, the supply of said hydrocarbons to the reaction zones being periodically discontinued while the catalyst disposed therein is regenerated by passing relatively dilute hot oxidizing gases in contact therewith to burn from the bed combustible materials deposited therein during the cracking reaction, and the supply of said hydrocarbons to the reaction zones being subsequently renewed and their catalytic cracking therein continued, the improvement which comprises, during the regenerating period, passing hot regenerating gases leaving each of said catalyst beds in contact with a mass of refractory material of high heat capacity to store heat in the latter and, during the subsequent cracking period, contacting hydrocarbons to be converted with thus heated refractory material prior to each successive contact thereof with the catalyst, whereby to supply to the hydrocarbons a portion of the heat required for effecting said catalytic cracking thereof, supplying additional heat to the hydrocarbons passing from each catalyst bed to the next successive catalyst bed, and abstracting heat from the hot reactivating gases passing from each catalyst bed to the next successive catalyst bed, in addition to that abstracted therefrom by their contact with said refractory material.

9. In a conversion process wherein heat is periodically stored in a mass of refractory material, reactants to be converted being passed, subsequent to said heating of the mass, in contact therewith to abstract heat therefrom and supply heat to the reactants, the thus heated reactants being subsequently supplied to a zone wherein the desired conversion thereof is effected, the improvement which comprises, passing only a portion of the total reactants being supplied to said conversion zone in contact with said hot refractory mass, commingling the remaining portion thereof with the heated reactants discharged from said mass, supplying the commingled reactants to said conversion zone, and increasing the quantity of the first named portion as the operation progresses and as the hot refractory mass is cooled to maintain the temperature of the comming₁ed reactants being supplied to said conversion zone substantially constant.

10. In a conversion process employing a reaction zone wherein hydrocarbon reactants to be converted are contacted with a porous bed of solid contact material which promotes their endothermic conversion, the supply of said reactants to the reaction zone being periodically discontinued while deleterious heavy combustible conversion products deposited in said bed during the conversion reaction are burned therefrom to regenerate the same by passing relatively dilute hot oxidizing gases in contact therewith, the supply of said reactants to the reaction zone being subsequently renewed and the conversion reaction therein continued, the improvement which comprises, during the regenerating step, passing hot gases leaving said bed in contact with a mass of refractory material of high heat capacity to store heat in the latter and, during the subsequent conversion period, passing a regulated quantity of the hydrocarbon reactants to be converted in contact with said heated refractory mass to supply heat to the reactants, commingling the thus heated reactants with another regulated quantity of said hydrocarbon reactants not contacted with the hot refractory mass, passing the commingled reactants into contact with said bed, and diminishing the quantity of reactants not passed in contact with said hot refractory mass as the conversion period progresses and as the hot refractory mass is cooled so as to maintain the temperature of the commingled reactants entering said bed substantially uniform during the entire conversion period.

11. In a conversion process employing a reaction zone wherein hydrocarbon reactants to be converted are contacted with a porous bed of solid contact material which promotes endothermic conversion of the reactants, the supply of said hydrocarbons to the reaction zone being periodically discontinued while deleterious heavy combustible conversion products deposited in said bed during the conversion reaction are burned therefrom to regenerate the same by passing relatively dilute hot oxidizing gases in contact therewith, the supply of said reactants to the reaction zone being subsequently renewed and the conversion reaction therein continued, the improvement which comprises, during the regenerating step passing a portion of the hot gases leaving said bed in contact with a mass of refractory material of high heat capacity to store heat in the latter, preventing contact between said mass and another portion of said hot gases, during the subsequent conversion period passing hydrocarbon reactants to be converted in contact with the heated refractory mass prior to their contact with said bed, whereby to supply to said reactants at least a portion of the heat required for effecting their conversion, and so controlling the quantity of said hot gases not passed in contact with said mass that substantially only the quantity of heat available in the hot gases which is required for conducting the subsequent conversion step is imparted to the refractory mass.

12. In a conversion process employing a reaction zone wherein hydrocarbon reactants to be converted are contacted with a porous bed of solid contact material which promotes endothermic conversion of the reactants, the supply of said hydrocarbons to the reaction zone being periodically discontinued while deleterious heavy combustible conversion products deposited in said bed during the conversion reaction are burned therefrom to regenerate the same by passing relatively dilute hot oxidizing gases in contact therewith, the supply of said reactants to the reaction zone being subsequently renewed and the conversion reaction therein continued, the improvement which comprises, during the regenerating step passing a portion of the hot gases leaving said bed in contact with a mass of refractory material of high heat capacity to store heat in the latter, preventing contact between said mass and another portion of said hot gases, during the subsequent conversion period passing hydrocarbon reactants to be converted in contact with the heated refractory mass prior to their contact with said bed, whereby to supply to said reactants at least a portion of the heat required for effecting their conversion, and limiting the quantity of said hot gases passed in contact with the refractory mass to avoid excessive heat storage in the latter and assist in preventing excessive heating of the reactants passed therethrough during the subsequent conversion period.

13. In a conversion process employing a plurality of reaction zones through which heated hydrocarbon reactants to be converted are passed in series flow arrangement and contacted in each of said zones with a porous bed of solid contact material of relatively low thermal conductivity which promotes their endothermic conversion, the supply of said reactants to the reaction zones being periodically discontinued while the contact material disposed therein is regenerated by passing relatively dilute hot oxidizing gases in contact therewith to burn from the bed combustible materials deposited therein during the conversion reaction, and the supply of said reactants to said reaction zones being subsequently renewed and their endothermic conversion therein continued, the improvement which comprises, during the regenerating period, passing hot regenerating gases leaving each of said beds in contact with a mass of refractory material of high heat capacity to store heat in the latter and, during the subsequent conversion period contacting reactants to be converted with thus heated refractory material prior to each successive contact thereof with the contact material, whereby to supply to said reactants at least a portion of the heat required for effecting said conversion thereof, the process being further characterized in that the regenerating gases are passed through said reaction zones in series, the temperature of the reactivating gases passing from the hot refractory material to each successive bed of contact material being so modified and the oxygen concentration of the reactivating gases entering each bed of contact material and their rate of flow therethrough being so maintained that regeneration of the contact beds is accomplished within a temperature range beneath that at which damage to the contact material will occur.

14. In a conversion process employing a plurality of reaction zones through which heated hydrocarbon reactants to be converted are passed in series flow arrangement and contacted in each of said zones with a porous bed of solid contact material of relatively low thermal conductivity which promotes their endothermic conversion, the supply of said reactants to the reaction zones being periodically discontinued while the contact material disposed therein is regenerated by passing relatively dilute hot oxidizing gases in contact therewith to burn from the bed combustible materials deposited therein during the conversion reaction, and the supply of said reactants to said reaction zones being subsequently renewed and their endothermic conversion therein continued, the improvement which comprises, during the regenerating period, passing hot regenerating gases leaving each of said beds in contact with a mass of refractory material of high heat capacity to store heat in the latter and, during the subsequent conversion period contacting reactants to be converted with thus heated refractory material prior to each successive contact thereof with the contact material, whereby to supply to said reactants a portion of the heat required for effecting said endothermic conversion thereof, supplying additional heat to the reactants passing from each bed of contact material to the next successive bed thereof, and abstracting heat from the reactivating gases passing from each bed of contact material to the next successive bed thereof, in addition to that abstracted therefrom by their contact with said refractory material.

15. The process of catalytically converting hydrocarbons, which comprises heating a flowing stream thereof to the desired conversion temperature under conditions regulated to preclude substantial thermal conversion thereof, passing resulting heated reactants in series through separate beds of active catalytic material and therein effecting said catalytic conversion thereof, maintaining the temperature in each of said catalyst beds within the range required for conducting the desired conversion reaction by adjusting the temperature of said reactants to the desired value prior to each successive contact thereof with a bed of said catalytic material, accomplishing said adjustment, at least in part, by passing said reactants in regulated quantity through a mass of previously heated refractory material prior to each successive contact thereof with the catalyst, periodically diverting said stream of reactants to and through another group of separate catalyst beds in series and therein continuing the conversion reaction in the manner hereinbefore described, simultaneous with the passage of said heated reactants through the second group of catalyst beds, regenerating the catalyst in the first group of beds by burning therefrom heavy combustible conversion products deposited thereon during the preceding conversion reaction in a stream of hot oxidizing gases, utilizing resulting hot regenerating gases leaving each of the catalyst beds during the regenerating step to supply heat to said refractory material for conducting the subsequent conversion step in the same group of catalyst beds by passing hot gases thus derived in contact with the refractory material, subsequently again passing said stream of hydrocarbon reactants in contact with the catalyst beds of the first mentioned group and therein continuing the conversion reaction in the same manner as hereinbefore described.

PERCY MATHER.
LEV A. MEKLER.